UNITED STATES PATENT OFFICE.

JOSEF CZERNY, OF NEW YORK, N. Y., ASSIGNOR TO MOSES LEMPERT, OF NEW YORK, N. Y.

COMPOSITION FOR TREATING PAPER.

No. 854,470. Specification of Letters Patent. Patented May 21, 1907.

Application filed December 4, 1906. Serial No. 346,213.

*To all whom it may concern:*

Be it known that I, JOSEF CZERNY, a subject of the Emperor of Austria, and a resident of the city of New York, borough of Manhattan, county and State of New York, have invented a new and Improved Composition for Treating Paper, of which the following is a full, clear, and exact description.

This invention is an improved composition for treating paper, especially in the form of card-board, rendering it hard, durable and resistant, particularly desirable in the manufacture of hair bottoms and many other articles.

The composition consists of the following ingredients: white potato powder, starch, tragacanth gum and water, which are mixed in the proportions and in the manner hereinafter outlined.

To 50 parts, by weight, of water about 100° Fahrenheit are added 65 parts of white potato powder, (which is made by drying and grinding the potato into a flour) 15 parts of corn-starch and 5 parts of rice-starch. This is thoroughly mixed and allowed to stand a short time, when it ferments. To this fermented composition is thereafter added 15 parts of East India tragacanth gum, which has been disolved in a small quantity of water. The compound is now ready for use and is preferably applied to the paper by dipping the same therein, or may be applied to the paper in any other desired manner. The paper, after being saturated in this compound and allowed to dry, becomes hard and will withstand wear and rough usage like wood.

Having thus described my invention I claim as new and desire to secure by Letters Patent:

1. A compound for treating paper, consisting of potato, corn-starch, rice-starch and gum.

2. A compound for treating paper, consisting of white potato powder, corn-starch, rice-starch and gum tragacanth, mixed in substantially the proportions and in the manner set forth.

In testimony whereof I have signed my name to this specification in the presence of two subscribing witnesses.

JOSEF CZERNY.

Witnesses:
W. W. HOLT,
JULIUS H. REIFIN.